United States Patent [19]
Miyaji

[11] Patent Number: 5,206,739
[45] Date of Patent: Apr. 27, 1993

[54] INTEGRAL RECORDING UNIT TYPE TELEVISION CAMERA WITH RECORDING CONTROL FOR EXTERNAL RECORDING UNIT

[75] Inventor: Noritaka Miyaji, Kanagawa, Japan

[73] Assignee: Sony Corporation, Tokyo, Japan

[21] Appl. No.: 675,516

[22] Filed: Mar. 27, 1991

[30] Foreign Application Priority Data

Mar. 27, 1990 [JP] Japan .................................. 2-78191
Mar. 28, 1990 [JP] Japan .................................. 2-79103

[51] Int. Cl.$^5$ ............................................. H04N 5/76
[52] U.S. Cl. .................................. 358/335; 358/906; 358/909
[58] Field of Search ............... 358/335, 310, 311, 906, 358/909; 360/13, 14.1, 10.3, 33.1, 35.1

[56] References Cited

U.S. PATENT DOCUMENTS

| | | | |
|---|---|---|---|
| 3,890,638 | 6/1975 | Bargen | 388/311 |
| 4,428,001 | 1/1984 | Yamamura et al. | 358/335 |
| 4,618,895 | 10/1986 | Wright | 358/311 |
| 4,668,999 | 5/1987 | De La Cierva, Sr. et al. | 358/906 |
| 4,691,253 | 9/1987 | Silver | 358/906 |
| 4,792,863 | 12/1988 | Urabe | 358/335 |
| 4,811,118 | 3/1989 | Katoh et al. | 358/906 |
| 4,837,638 | 6/1989 | Fullwood | 358/311 |

Primary Examiner—Tommy P. Chin
Assistant Examiner—Thai Tran
Attorney, Agent, or Firm—Hill, Steadman & Simpson

[57] ABSTRACT

An integral recording unit type television camera which is provided with a trigger signal generating unit which generates an external trigger signal and internal trigger signal for controlling to a recording state or stopping state an external recording unit and internal recording unit by operation of a start/stop switch and which controls a trigger signal generating unit so as to output both the external trigger signal and the internal trigger signal when both an external recording unit and an internal recording unit are in the recording state or stop state and so as to output just the internal trigger signal when the external recording unit is in the recording state and the internal recording unit is in the stop state when a tape cassette of the internal recording unit is in a recording standby state, it is possible to place both the internal recording unit and external recording unit simultaneously in the recording state or the stop state by operation of a single start/stop switch when the recording state of the internal recording unit is released due to the tape running out or other reasons, it is possible to place the internal recording unit in the recording state again without release of the recording state of the external recording unit by mounting a new tape cassette and operating the start/stop switch, this thus enables simultaneous control of the recording of the external recording unit and the internal recording unit at the television camera side and, further, simplifies the operation due to operation by a single start/stop switch.

9 Claims, 3 Drawing Sheets

INTEGRAL RECORDING UNIT TYPE TELEVISION CAMERA WITH RECORDING CONTROL FOR EXTERNAL RECORDING UNIT

DESCRIPTION OF THE INVENTION

1. Field of Utilization in Industry

The present invention relates to an integral recording unit type television camera, more particularly an internal recording unit type television camera which can be connected to an external recording unit and perform simultaneous recording using the external recording unit and an internal recording unit, and still more particularly to an internal recording unit type television camera which can display the state of operation of the external recording unit.

2. Description of the Related Art

To simultaneously record a picture taken by an integral recording unit type television camera on two tape cassettes, the general practice is to connect the integral recording unit type television camera to an external recording unit by cable and use both the external recording unit and internal recording unit. When the internal recording unit broken down etc., the picture could still be recorded by the external recording unit in some cases.

In conventional integral recording unit type television cameras, however, only video signals were sent to the external recording unit. It was not possible to control the external recording unit. Therefore, the two recording units had to be operated independently. Further, it was not easy to match the timings of start of recording and the timings of completion of recording, making the operation troublesome.

Further, while conventional integral recording unit type television cameras had display means which enabled confirmation of the state of operation by the display state, it was only possible to display the operating state of the internal recording unit. To determine the state of operation of the external recording unit, one could only check the display means of the external recording unit, i.e., it was not possible to determine the state of operation of the external recording unit at the television camera side. Therefore, the cameraman shooting an object by the camera unit of the television camera could not determine the state of operation of the external recording unit and situations sometimes arose where the fact that the external recording unit had stopped due to the tape running out or a breakdown could not be discerned and therefore the desired picture could not be recorded on tape.

SUMMARY OF THE INVENTION

The present invention has as its object the provision of an integral recording unit type television camera which can perform simultaneous control of recording by a simple operation when connected to an external recording unit.

The present invention has as a further object the provision of an integral recording unit type television camera which can display not only the operating state of the internal recording unit, but also the operating state of the external recording unit.

To achieve the first object, the integral recording unit type television camera of the present invention comprises an internal recording unit which stores video signals supplied from a picture element A means is provided for supplying the video signal through a cable to an external recording unit: AN external recording state detection means detects which of a recording state and a stopping state the external recording unit is in; an internal recording state detection means detects which of a recording state and a stopping state the internal recording unit is in; A cassette status detection means detects if a tape cassette in the internal recording unit is in a state standing by for recording; A trigger signal generating means generates an external trigger signal and an internal trigger signal for controlling to one of a recording state and stopping state the external recording unit A the internal recording unit by operation of a start/stop switch; and a control means controls the trigger signal generating means so as to output both the external trigger signal and the internal trigger signal when both the external recording state detection means and the internal recording state detection means detects one of the recording state, stopping state and so as to output just the internal trigger signal when the internal recording state detection means detects the recording state and the internal recording state detection means detects the stopping state and, when, the cassette state detection means detects a recording standby state.

To achieve the second object of the present invention, the integral recording unit type television camera comprises an internal recording unit for recording a video signal supplied from a picture element A means for supplies the video signal through a cable to AN external recording unit; and AND circuit for obtains the AND condition of an internal status signal showing the operating state of the internal recording unit and an external status signal showing the operating state of the external recording unit; AN OR circuit obtains the OR condition of the internal status signal and the external status signal; A control means supplies a display means with the output of the AND circuit when both the internal recording unit and the external recording unit are in the recording state, and the output of the OR circuit when only one of the internal recording unit and the external recording unit are in the recording state.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

The gist of the first aspect of the present invention is as follows. When the internal recording unit and external recording unit are both in a stop state, the start/stop switch on the television camera side may be operated to simultaneously switch the internal recording unit and external recording unit to the recording state. If the start/stop switch is further operated in that state, the internal recording unit and external recording unit are simultaneously switched to the stop state. Further, when the two units are recording and the internal recording unit stops due to the tape running out or other reasons, it is possible to switch the internal recording unit back to the recording state for simultaneous recording, while keeping the external recording unit in the recording state, by mounting a new tape cassette and operating the start/stop switch.

An embodiment of the present invention will be explained below using the drawings.

Figure 1:
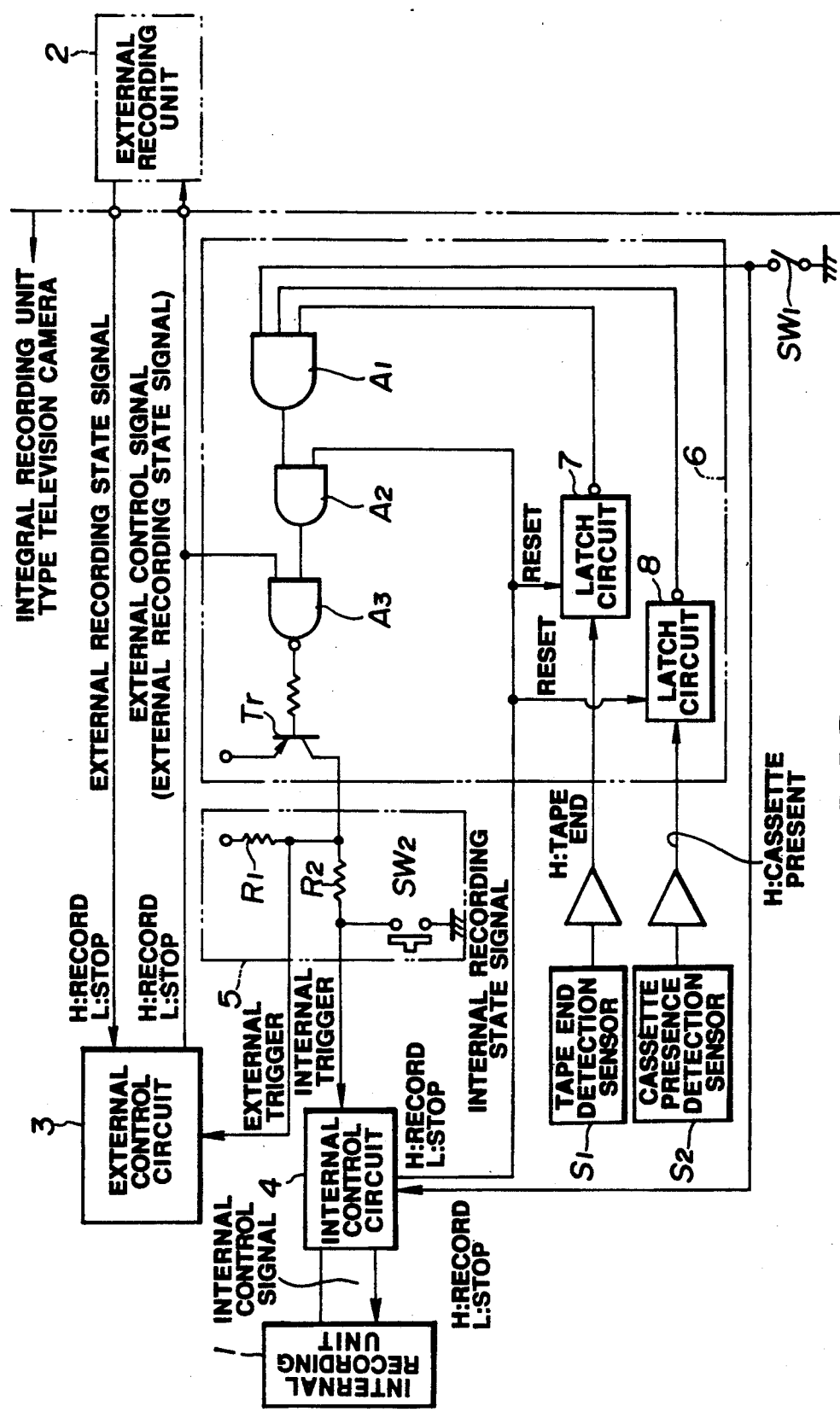
FIG. 1 is a block diagram of a recording control system.

FIG. 1 shows an embodiment of the present invention.

FIG. 1 is a block diagram of a recording control system of an integral recording unit type television camera. In FIG. 1, the integral recording unit type television camera has a camera unit which has a picture element, converts optical signals to electrical signals, and prepares video signals and an internal recording unit 1 which records the video signals output by the camera unit. The television camera has connected to it through a cable (not shown) an external recording unit 2, which external recording unit 2 is also supplied with the video signals output by the camera unit. Through the cable, the external recording unit 2 is also supplied with external control signals and from the external recording unit 2 are output recording state signals for indicating a recording state or a stop state. The external recording unit 2 is constructed of a video tape recorder using tape cassettes, is controlled to record and stop by the external control signals, and may be controlled to record and stop by its own operating unit.

On the other hand, the television camera has an external control circuit 3 and an internal control circuit 4. The external control circuit 3 outputs an external control signal which alternately repeats an H level showing the recording state and an L level showing the stopping state, with each input of an external trigger signal of the trigger signal generating means 5, to the external recording unit 2 as mentioned above and also to a third AND circuit A3 of a control means 6 mentioned later. The external control signal output to the third AND circuit A3 is used as a signal showing if the external recording unit 2 is in the recording state or the stopping state. In this embodiment, the external control circuit 3 comprises as an external recording state detection means. Further, the external control circuit 3 has led to it a recording state signal of the external recording unit 2, by which signal it is possible to confirm the state of the external recording unit 2. The internal control circuit 4 outputs an internal control signal which alternately repeats an H level showing the recording state and an L level showing the stop state. with each input of an external trigger signal of the trigger signal generating means to the internal recording unit 1 as mentioned above. The internal recording unit 1 is comprised of a video tape recorder using a tape cassette, is controlled to record and stop by the internal control signal, and outputs to an internal control circuit 4 a recording state signal showing the recording state or stop state. By this signal, the internal control circuit 4 confirms the state of the internal recording unit 1 and, based on that signal, outputs an internal recording state signal of the L level when in the recording state and of the H level when in the stopping state to a second AND circuit A2 of the control means 6 mentioned later. In this embodiment, the internal control circuit 4 is designed as an internal recording state detection means. Further, the internal control circuit 4 has led to it an on/off information of an interface switch SW1. When the interface switch SW1 is on and a signal for selecting the interface mode (L level) is output, the internal trigger signal is ignored and the internal recording unit 1 enters the stopping state.

Further, the television camera has a cassette status detection means. This cassette status detection means detects if the tape cassette mounted in the internal recording unit 1 is in a recording standby state. In this embodiment, it is comprised of a tape end detection sensor S1 and a cassette presence detection sensor S2. The tape end detection sensor S1 detects if the tape of the tape cassette is at the end position (end of reel position) and outputs a signal of the H level when at the tape end and one of the L level when not. The cassette presence sensor S2 detects if a tape cassette is mounted in the internal recording unit 1 and outputs a signal of the H level when one is mounted and outputs the L level when one is not mounted.

The trigger signal generating means 5 is comprised of a first resistor R1, a second resistor R2, and a start/stop (S/S) switch SW2 in a series circuit, one end of the series circuit being connected to a power source and the other end being grounded. The voltage appearing at the common connection point of the first resistor R1 and the second resistor R2 is led to the external control circuit 3 as mentioned above as the external trigger signal. The voltage appearing at the common connection point of the second resistor R2 and the start/stop switch SW2 is led to the internal control circuit 4 as mentioned above as the internal trigger signal. Further, the output of the control means 6 is led to the common connection point of the first resistor R1 and the second resistor R2, by which output of the control means 6 the trigger generating mode of the trigger signal generating means 5 is controlled.

Figure 2:
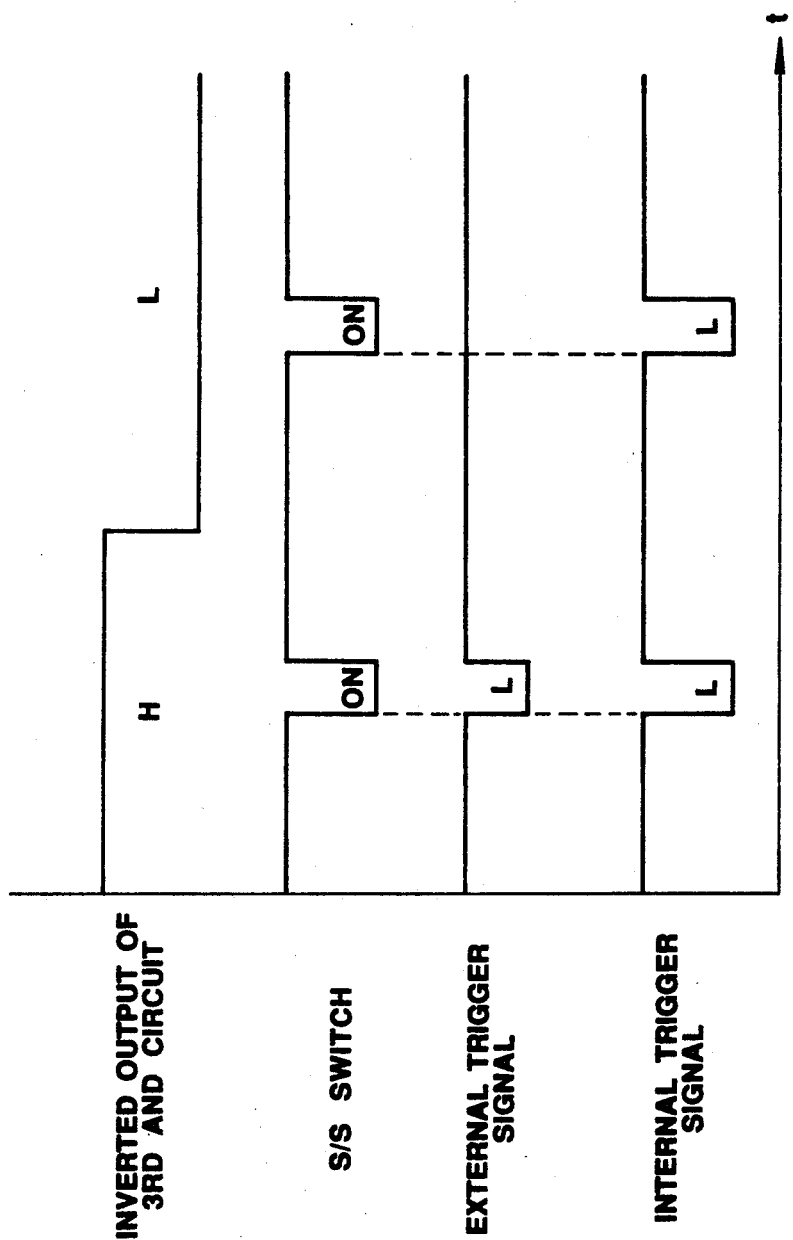
FIG. 2 is a time chart.

The control means 6 has two latch circuits 7 and 8, the latch circuit 7 being supplied with the output of the tape end detection sensor S1 and the other latch circuit 8 being supplied with the output of the cassette presence detection sensor S2. The latch circuits 7 and 8 are reset at the point of change of level of the internal control signal. The outputs of the latch circuits 7 and 8 are led to the first AND circuit A1. The output of the latch circuit 7 is led to it after being inverted. The first AND circuit A1 further has led to it the on/off information of the interface switch SW1, which first AND circuit A1 obtains the AND condition of three input signals and outputs to the second AND circuit A2. The second AND circuit A2 has led to it the internal control signal, as mentioned above, with the output of the second AND circuit A2 being supplied to the first AND circuit A1. The first AND circuit A1 further had led to it the external control signal, as mentioned above, the inverted output of the first AND circuit A1 being supplied to the base of a pnp-type transistor Tr. The collector output of the transistor Tr is supplied as mentioned above as the output of the control means 6. As shown in FIG. 2, when the inverted output of the third AND circuit A3 is the H level, the transistor Tr is off, so if the start/stop switch SW2 is depressed, the external trigger signal and internal trigger signal are both output. When the inverted output of the third AND circuit A3 is the L level, the transistor Tr is on, so if the start/stop switch SW2 is depressed, just the internal trigger signal is output.

Below, the operation of the above structure will be explained.

Tape cassettes are mounted in the external recording unit 2 and the internal recording unit 1, the desired object is fixed on by the camera unit, and the start/stop switch SW2 is depressed. When this is done, the external control signal is the L level, so regardless of the state of the other signal, the inverted output of the third AND circuit A3 becomes the H level and the external trigger signal and internal trigger signal are both generated. The external control circuit 3 switches the external control signal to the H level and the internal control circuit 4 switches the internal control signal to the L level, with the external recording unit 2 and the internal recording unit 1 simultaneously entering the recording state.

When the tape cassette of the internal recording unit 1 runs out of tape and stops, the tape cassette is exchanged and the start/stop switch SW2 is depressed. When this is done, the output of the tape end detection sensor S1 becomes the L level, the output of the cassette presence detection sensor S2 becomes the H level, and the internal recording state signal becomes the H level. The external control signal also is the H level. Therefore, the output of the third AND circuit A3 becomes the L level and only the internal trigger signal is output. By this, the internal recording unit enters the recording state, so once again the simultaneous recording state may be achieved.

When the tape cassette of the external recording unit runs out of tape and stops, the tape cassette is exchanged and the external recording unit 2 side is operated so as to place the external recording unit 2 in the recording state. Here, the person exchanging the tape cassette is at the external recording unit 2, so there is no trouble in operating the external recording unit 2 to place it in the recording state.

In this way, simultaneous recording is possible while exchanging the tape cassettes of the external recording unit 2 and the internal recording unit 1. In the simultaneous recording state, the start/stop switch SW2 is depressed. When this is done, the internal recording state signal is at the L level, so the inverted output of the third AND circuit A3 becomes the H level and the external trigger signal and the internal trigger signal are both generated. The external control circuit 3 switches the external control signal to the L level and the internal control circuit 4 switches the internal control signal to the H Level, with the external recording unit 2 and the internal recording unit 1 simultaneously entering the stop state.

When the tape of the tape cassette of the internal recording unit 1 becomes entangled etc. and the internal recording unit 1 is not used, the interface switch SW1 is turned off. When this is done, the internal control circuit 4 controls the internal recording unit 1 to the stop state regardless of the internal trigger signal and the inverted output of the third AND circuit A3 always is the H level. Therefore, when an external trigger signal is generated by the depression of the start/stop switch SW1, the external recording unit 2 can be controlled by the operation of the start/stop switch SW2.

Further, when the external recording unit 2 is not connected to the television camera, regardless of the state of the inverted output of the third AND circuit A3, depression of the start/stop switch SW2 will result in generation of an internal trigger signal, so the internal recording unit 1 can be controlled by the operation of the start/stop switch SW2.

As mentioned above, the present invention provides, as a first aspect, an integral recording unit type television camera which is provided with a trigger signal generating unit connected to an external recording unit through a cable, which is provided with a trigger signal generating means which generates an external trigger signal and internal trigger signal for controlling to a recording state or stop state the external recording unit and internal recording unit by operation of a start/stop switch, and which controls the trigger signal generating unit so as to output both the external trigger signal and the internal trigger signal when both the external recording unit and internal recording unit are in the recording state or stop state, and so as to output just the internal trigger signal when the external recording unit is in the recording state and the internal recording unit is in the stop state when, a tape cassette of the internal recording unit is in a recording standby state, it is possible to place both the internal recording unit and external recording unit simultaneously in the recording state or the stop state by operation of a single start/stop switch and when the recording state of the internal recording unit is released due to the tape running out or for other reasons, it is possible to place the internal recording unit in the recording state again without release of the recording state of the external recording unit by mounting a new tape cassette and operating the start/stop switch, thus enabling simultaneous control of the recording of the external recording unit and internal recording unit at the television camera side, and further simplifying the operation due to operation by a single start/stop switch.

The gist of the second aspect of the present invention is as follows. When both the recording units are in the recording state, the operating states of both are displayed by the display means by the AND signal of the internal status signal and the external status signal. When one or both are abnormal, that abnormal state is displayed by the display means. When one of the recording units is in the recording state, the operating state of the recording unit is displayed by the display means by the internal status signal or external status signal.

Below, an embodiment of the second aspect of the present invention will be explained using FIG. 3.

The integral recording unit type television camera of this embodiment is substantially the same in construction as that explained with reference to FIG. 1 and FIG. 2, that is, has a camera unit which has a picture element, converts optical signals to electrical signals, and prepares video signals and an internal recording unit which records the video signals output by the camera unit. The television camera may have connected to it through a cable (not shown) an external recording unit, which external recording unit is also supplied with the video signals output by the camera unit. The external recording unit and the internal recording unit are constructed of video tape recorders using tape cassettes and are controlled by an internal control circuit and external control circuit of the television camera, respectively. The internal control circuit outputs to the internal recording unit and internal control signal of the H level showing the recording control state and the L level showing the stop control state based on a command signal. When the internal status signal is the recording state, the signal becomes the H level and when it is the stop state becomes the L level. Further, in the alarm state, it becomes a pulse signal. The alarm is given when the end of the tape approaches, the battery needs to be replaced or recharged, there are servo defects, or other cases where a normal recording state cannot be maintained. The external control circuit outputs to the external recording unit an external control signal of the H level showing the recording control state and the L level showing the stop control state based on a command signal. The external recording unit sends to the external control circuit an external status signal showing the operating state in the same way as the internal recording unit. The content of the external status signal is the same as that of the internal status signal.

Figure 3:
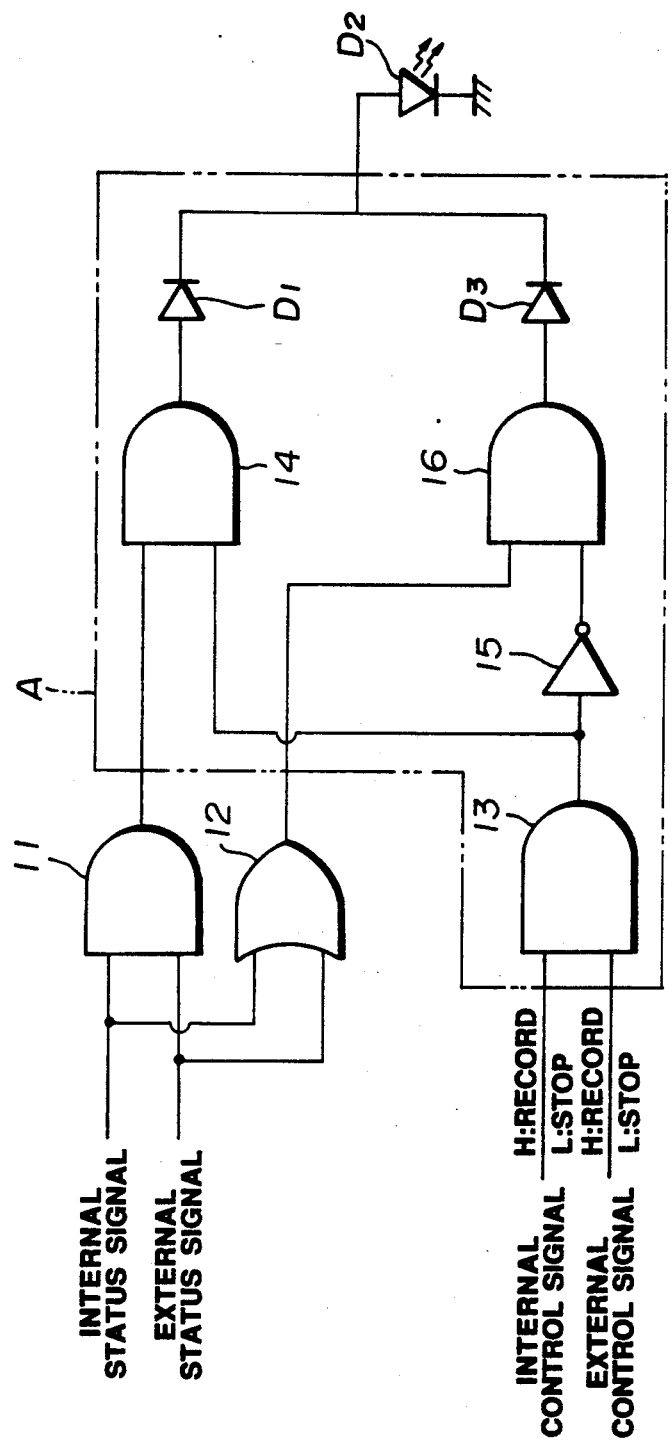
FIG. 3 is a block diagram of an operating status display system.

FIG. 3 is a block diagram of the operating status display system of the integral recording unit type television camera. In FIG. 3, an AND circuit 11 and OR circuit 12 have fed to them the internal status signal of the internal recording unit and the external status signal of the external recording unit, the outputs of the AND circuit 11 and the OR circuit 12 being fed to a control means A. The control means A has a first AND circuit 13, which first AND circuit 13 receives an input the internal control signal of the internal control circuit and the external control signal of the external control circuit. The first AND circuit 13 takes the AND condition of the two signals, the output being fed to a second AND circuit 14 and through a NOT circuit 15 to a third AND circuit 16. The second AND circuit 14 has fed to it the output of the AND circuit 11 as well, the output of the second AND circuit 14 being supplied through a diode D1 to a light emitting diode D2. The third AND circuit 16 has fed to it the output of the OR circuit 12 in addition to the output of the NOT circuit 15, the output of the third AND circuit 16 being supplied through a diode D3 to the light emitting diode D2. The light emitting diode D2 constitutes the display means and is provided in a view finder.

Below, the operation of the above structure will be explained.

When the recording state is selected for both the recording units, both the internal control signal and external control signal are the H level, so that second AND circuit 14 is selected and the output of the light emitting diode D2 is determined by the output of the AND circuit 11. That is, if the two recording units are operating normally, both the internal status signal and the external status signal are the H level, showing the recording state, and the light emitting diode D2 goes on, so it may be determined that the two recording units are operating normally. If one or both of the units does not operate, one or both of the signals will become the L level showing the stop state and the light emitting diode D2 will not go on, so it can be determined that one or both of the recording units is not operating. Further, if one or both of the recording units is operating, but is abnormal, the signals from one or both will be of a pulse nature indicating an abnormality, and the light emitting diode D2 will blink, so it can be determined that one or both of the units is abnormal.

Further, if the recording state is selected for one of the recording units, only one of the internal control signal and external control signal become the H level, so the third AND circuit 16 will be selected and the output of the light emitting diode D2 will be determined by the output of the OR circuit 12. That is, if the selected recording unit is operating normally, the internal control signal or external control signal will become the H level indicating the recording state and the light emitting diode D2 will go on, so it can be determined that the selected recording unit is operating normally. If the selected recording unit is not operating, the internal control signal or external control signal becomes the L level showing the stop state and the light emitting diode D2 will not go on, so it can be determined that the selected recording unit is not operating. If the selected recording unit is operating, but is abnormal, the internal status signal or the external status signal will become a pulse signal showing an abnormality and the light emitting diode D2 will blink, so it can be determined that the selected recording unit is abnormal.

In this way, it is possible to determine even the operating state of not only the internal recording unit but also the external recording unit at the television camera side. Further, in this embodiment, there is the advantage that the operating state can be displayed for one or both of the recording states by a single light emitting diode.

As mentioned above, the second aspect of the present invention provides an integral recording unit type television camera which can be connected to an external recording unit by a cable, An AND circuit and an OR circuit are provided for obtaining the AND condition and OR condition of an internal status signal showing the operating state of the internal recording unit and an external status signal showing the operating state of the external recording unit, respectively. The output of the AND circuit is supplied to a display means when both the recording units are in the recording state and the output of the OR circuit is supplied to the display means when one is in the recording state, so the operating states of the two recording units are displayed by the display means by the AND signal of the internal status signal and the external status signal when both the recording units are in the recording state, An abnormality is displayed by the display means if one or both of the recording units show an abnormality, and the operating state of a single recording unit is displayed by the display means by the internal status signal or the external status signal when that recording unit is in the recording state, there is thus the effect that it is possible to recognize the operating states of not only the internal recording unit but also the external recording unit by the display means.

Although various minor changes and modifications might be proposed by those skilled in the art, it will be understood that I wish to include within the claims of the patent warranted hereon all such changes and mortifications as reasonably come within my contribution to the art.

I claim:

1. An integral recording unit type television camera system, comprising:

an integral recording unit type television camera having a television camera and an integral internal recording unit means for storing video signals supplied from a picture element of the television camera, said integral recording unit means and television camera being operated as an integral unit by a user;

an external recording unit means for recording video signals input thereto from a cable connecting the integral recording unit type television camera to the separate external recording unit means; and said integral recording unit type television camera having integral therewith means for permitting user control of said external recording unit means when said user is operating said integral recording unit type television camera, said integral means comprising means for supplying said video signals from said television camera through said cable to said external recording unit means;

an external recording state detection means for detecting which of a recording state and a stop state said external recording unit means is in;

an internal recording state detection means for detecting which of a recording state and a stop state said internal recording unit means is in;

a cassette status detection means for detecting if a tape cassette in said internal recording unit means is in a state standing by for recording;

a trigger signal generating means for generating an external trigger signal and an internal trigger signal in at least some instances for substantially simultaneously controlling said external recording unit means and said internal recording unit means to both enter either a recording state or stop state by operation of the start/stop switch which is integral with said integral recording unit type television camera; and a control means for controlling said trigger signal generating means so as to output both said external trigger signal and said internal trigger signal when both said external recording state detection means and said internal recording state detection means detects the same state and so as to output just said internal trigger signal when said external recording state detection means detects the recording state, said internal recording state detection means detects the stop state, and said cassette state detection means detects the standing by recording state.

2. An integral recording unit type television camera system, comprising:

an integral recording unit type television camera having a television camera and an integral internal recording unit means for storing video signals supplied from a picture element of the television camera, said integral recording unit means and television camera being operated as n integral unit by a user;

an external recording unit means for recording video signals input thereto from a cable connecting the integral recording unit type television camera to the separate external recording unit means; and said integral recording unit type television camera having integral therewith means for permitting user control of said external recording unit means when said user is operating said integral recording unit type television camera, said integral means comprising means for supplying said video signals from said television camera through said cable to said external recording unit means;

an external recording state detection means for detecting which of a recording state and a stop state said external recording unit means is in;

an internal recording state detection means for detecting which of a recording state and a stop state said internal recording unit means is in;

a cassette status detection means for detecting if a tape cassette in said internal recording unit means is in a state standing by for recording;

a trigger signal generating means for generating an external trigger signal and an internal trigger signal for controlling said external recording unit means and/or said internal recording unit means to enter either a recording state or stop state by operation of the start/stop switch which is integral with said integral recording unit type television camera; and a control means for controlling said trigger signal generating means so as to output both said external trigger signal and said internal trigger signal when both said external recording state detection means and said internal recording state detection means detects the same state and so as to output just said internal trigger signal when said external recording state detection means detects the recording state, said internal recording state detection means detects the stop state, and said cassette state detection means detects the standing by recording state.

3. An integral recording unit type television camera system, comprising:

an integral recording unit type television camera having a television camera and an integral internal recording unit means for storing video signals supplied from a picture element of the television camera, said integral recording unit means and television camera being operated as an integral unit by a user;

an external recording unit means for recording video signals input thereto from a cable connecting the integral recording unit type television camera to the separate external recording unit means; and said integral recording unit type television camera having integral therewith means for permitting user control of said external recording unit means when said user is operating said integral recording unit type television camera, said integral means comprising means for supplying said video signals from said television camera through said cable to said external recording unit means;

an external recording state detection means for detecting which of a recording state and a stop state said external recording unit means is in;

an internal recording state detection means for detecting which of a recording state and a stop state said internal recording unit means is in;

a cassette status detection means for detecting if a tape cassette in said internal recording unit means is in a state standing by for recording;

a trigger signal generating means for generating an external trigger signal and an internal trigger signal for in at least some instances substantially simultaneously controlling said external recording unit means and said internal recording unit means to both enter either a recording state or stop state by operation of the start/stop switch which is integral with said integral recording unit type television camera; and a control means connected to said external and internal recording state detection means for controlling said trigger signal generating means so that when both the internal recording unit and external recording unit are stopped, both units can be started by operation of the start/stop switch, when both the external and internal recording unit means are recording, both can be stopped by operation of the start/stop switch, and said control means having a cassette state detection means for detecting a recording standby state for a cassette in said internal recording unit means, and said control means starting said internal recording unit means by operation of said start/stop switch if it was previously stopped, the cassette state detection means indicates a recording standby state, and said external recording unit means is recording, said recording of said external recording unit means continuing so that simultaneous recording occurs thereafter by both recording unit means.

4. An integral recording unit type television camera system, comprising:

an integral recording unit type television camera having a television camera and an integral internal recording unit means for storing video signals supplied from a picture element of the television camera, said integral recording unit means and television camera being operated as an integral unit by a user;

an external recording unit means for recording video signals input thereto from a cable connecting the integral recording unit type television camera to the separate external recording unit means; and said integral recording unit type television camera having integral therewith means for permitting user control of said external recording unit means when said user is operating said integral recording unit type television camera, said integral means comprising means for supplying said video signals from said television camera through said cable to said external recording unit means;

an external recording state detection means for detecting which of a recording state and a stop state said external recording unit means is in;

an internal recording state detection means for detecting which of a recording state and a stop state said internal recording unit means is in;

a cassette status detection means for detecting if a tape cassette in said internal recording unit means is in a state standing by for recording;

a trigger signal generating means for generating an external trigger signal and an internal trigger signal for in at least some instances substantially simultaneously controlling said external recording unit means and said internal recording unit means to both enter either a recording state or stop state by operation of the start/stop switch which is integral with said integral recording unit type television camera; and a control means connected to said internal and external recording state detection means and said cassette status detection means for controlling said trigger signal generating means so that when both the internal recording unit and external recording unit are stopped, both units can be started by operation of the start/stop switch, and when both the external and internal recording unit means are recording, both can be stopped by operation of the start/stop switch.

5. An integral recording unit type television camera system, comprising:

an integral recording unit type television camera having an internal recording unit integral with a television camera, said internal recording unit means recording a video signal supplied from said camera;

an external recording unit means connected through a cable but not integral with said integral recording unit television camera;

means for generating an internal status signal showing an operating state of the internal recording unit means;

means for generating an external status signal showing an operating state of the external recording unit means; and said integral recording unit type television camera having integral therewith and for operator use when the operator is using the integral recording unit type television camera means for supplying the video signal through said cable to said external recording unit means;

an AND circuit means for obtaining an AND condition when said internal status signal input to said AND circuit shows said operating state of the internal recording unit means and said external status signal input to said AND circuit means shows said operating state of the external recording unit means;

an OR circuit means for obtaining an OR condition of said internal status signal and said external status signal applied thereto; and a control means for supplying a display means with an output of the AND circuit means when both the internal recording unit means and the external recording unit means are in the recording state and an output of the OR circuit means when only one of the internal recording unit means and the external recording unit means are in the recording state.

6. An integral recording unit type television camera system, comprising:

an integral recording unit type television camera having an internal recording unit integral with a television camera having a picture element, said internal recording unit means recording a video signal supplied from said camera;

an external recording unit means connected through a cable but not integral with said integral recording unit television camera for recording video signals received through said cable; and said integral recording unit type television camera having integral therewith and for operator use when the operator is using the integral recording unit type television camera means for supplying the video signal through said cable to said external recording unit means; and means for displaying by a constant illumination to said user both said internal recording unit means and external recording unit means are in a recording state, and for displaying by no illumination to the user when only one of said internal recording unit means or external recording unit means are in the recording state.

7. A system according to claim 6 wherein said display means provides a blinking indication when there is a malfunction in one of said internal recording unit means or external recording unit means.

8. An apparatus, comprising: as a single unit a video camera and an integral internal video recorder means for recording and/or reproducing a video signal generated by said video camera;

an external video recorder means outside of said single unit and connected thereto by a cable for recording video received from said cable from said first video recorder means; and said single unit having integrally contained therein separate and apart from said external video recorder means
first means for detecting a recording operation of said internal and external video recorder means;
second means for detecting an existence of the record medium in aid internal video recorder means and a condition indicating whether said record medium is ready for recording; and
means for generating internal and external trigger signals in response to a command signal generated by an operation of a command key in said single unit and output signals of said fist and second detecting means for activating at least one of said internal and external video recorder means to start recording operation thereby.

9. An apparatus according to claim 8 further including an interface switch means in said single unit which is turned off when said internal recording unit means is not being used so that said command key operates the external recording unit means and maintains said internal recording unit means in a stop condition.

* * * * *